United States Patent
El-Wardany et al.

(10) Patent No.: US 8,439,724 B2
(45) Date of Patent: May 14, 2013

(54) ABRASIVE WATERJET MACHINING AND METHOD TO MANUFACTURE A CURVED ROTOR BLADE RETENTION SLOT

(75) Inventors: Tahany Ibrahim El-Wardany, Bloomfield, CT (US); Peter G. Smith, Wallingford, CT (US); Warren Reynolds, Stoney Creek (CA); Eugene Ng, Ancaster (CA); Kay V. Adams, Plainfield, IN (US)

(73) Assignee: United Technologies Corporation, Hartford, CT (US)

( * ) Notice: Subject to any disclaimer, the term of this patent is extended or adjusted under 35 U.S.C. 154(b) by 1219 days.

(21) Appl. No.: 12/164,311

(22) Filed: Jun. 30, 2008

(65) Prior Publication Data

US 2009/0325468 A1   Dec. 31, 2009

(51) Int. Cl.
*B24C 1/00* (2006.01)

(52) U.S. Cl.
USPC .................. 451/38; 451/39; 451/40

(58) Field of Classification Search .............. 451/28, 451/38–40
See application file for complete search history.

(56) References Cited

U.S. PATENT DOCUMENTS

| | | | |
|---|---|---|---|
| 1,614,558 A * | 1/1927 | Kasley | 409/131 |
| 4,260,331 A | 4/1981 | Goodwin | |
| 4,824,328 A | 4/1989 | Pisz et al. | |
| 4,827,675 A * | 5/1989 | Andrews | 451/28 |
| 5,403,156 A | 4/1995 | Arness et al. | |
| 5,425,622 A | 6/1995 | Murray | |
| 5,430,936 A | 7/1995 | Yazdzik, Jr. et al. | |
| 5,643,058 A | 7/1997 | Erichsen et al. | |
| 5,676,505 A * | 10/1997 | Gauss et al. | 409/132 |
| 5,688,108 A | 11/1997 | Dierksmeier et al. | |
| 5,741,119 A | 4/1998 | Heppenstall | |
| 5,836,742 A | 11/1998 | Dierksmeier et al. | |
| 5,863,183 A | 1/1999 | Dierksmeier et al. | |
| 6,109,877 A | 8/2000 | Gekht et al. | |
| 6,244,822 B1 | 6/2001 | Sinclair et al. | |
| 6,302,651 B1 | 10/2001 | Kildea et al. | |
| 6,315,298 B1 | 11/2001 | Kildea et al. | |
| 6,474,946 B2 | 11/2002 | Kildea | |
| 6,524,074 B2 | 2/2003 | Farrar et al. | |
| 6,669,447 B2 | 12/2003 | Norris et al. | |
| 6,767,168 B2 | 7/2004 | Miller | |
| 6,846,159 B2 | 1/2005 | Zabawa et al. | |
| 6,893,226 B2 | 5/2005 | Phipps | |

(Continued)

FOREIGN PATENT DOCUMENTS

GB            2349111 A  * 10/2000

OTHER PUBLICATIONS

Andrej Lebar and Michael Junkar, Simulation of abrasive water jet cutting process: Part 1. Unit event approach, Institute of Physics Publishing Modelling and Simulation in Materials Science and Engineering, Modelling Simul. Mater. Sci. Eng. 12 (2004) 1159-1170 PII: S0965-0393(04)78666-0.

*Primary Examiner* — Maurina Rachuba

(74) *Attorney, Agent, or Firm* — Carlson, Gaskey & Olds, PC

(57) ABSTRACT

A method of machining a blade retention slot with an abrasive water jet machining. A straight blade retention slot along an X-axis then a at least one side of the straight blade retention slot is abrasive water jet machined to generate a curved side of the blade retention slot defined within an X-Y plane.

14 Claims, 8 Drawing Sheets

U.S. PATENT DOCUMENTS

| | | |
|---|---|---|
| 6,951,448 B2 | 10/2005 | Duesler et al. |
| 6,969,817 B2 | 11/2005 | Lee et al. |
| 7,007,382 B2 * | 3/2006 | Mantel ......................... 29/889.2 |
| 7,025,568 B2 | 4/2006 | Jones |
| 7,104,759 B2 | 9/2006 | Tipton et al. |
| 7,118,346 B2 | 10/2006 | Read |
| 7,153,098 B2 | 12/2006 | Zabawa |
| 7,153,102 B2 | 12/2006 | Stone |
| 7,156,621 B2 | 1/2007 | Stone |
| 7,300,246 B2 | 11/2007 | Durocher et al. |
| 7,311,500 B2 | 12/2007 | Rongong et al. |
| 7,316,057 B2 | 1/2008 | Seth |
| 2004/0107572 A1 * | 6/2004 | Przybylski et al. .......... 29/889.7 |
| 2005/0175462 A1 | 8/2005 | Lagrange et al. |
| 2006/0180579 A1 * | 8/2006 | Popescu et al. .......... 219/121.18 |
| 2009/0214351 A1 * | 8/2009 | Guo ........................... 416/219 R |
| 2009/0260994 A1 * | 10/2009 | Joslin ........................... 205/662 |

* cited by examiner

ABRASIVE WATERJET MACHINING AND METHOD TO MANUFACTURE A CURVED ROTOR BLADE RETENTION SLOT

BACKGROUND

The present invention relates to a gas turbine engine, and more particularly to process tooling and procedures to machine curved blade retention slots within a rotor disk.

A gas turbine has a multiple of rotor blades that may be secured to a multiple of rotor disks. The blade/disk attachment configurations utilize a convoluted attachment section complementary to a convoluted slot in the rotor disk periphery.

Various manufacturing methods have been used or proposed to efficiently form the blade retention slots. The most common method of manufacturing blade retention slots is a broaching process. Although effective, broaching of nickel based super alloys typical of a rotor disk may induce material strain hardening, surface microstructure alteration and slot deformation. Aside from the relatively high cost of the broach tools and limited tool life, part scrap rate may increase due to the defected surface integrity. Furthermore, broaching processes only generate straight slots.

Curved slot attachment configurations in highly cambered turbine airfoils minimize platform overhang and optimize stress distribution to reduce centrifugal forces, bending moments, vibrations and peak stresses. Curved slot attachment configurations, however, may be difficult to produce and are not readily produced through broaching processes.

SUMMARY

A method of machining a blade retention slot according to an exemplary aspect of the present invention includes: abrasive water jet machining a straight blade retention slot along an X-axis and abrasive water jet machining at least one side of the straight blade retention slot to generate a curved side of the blade retention slot defined within an X-Y plane.

BRIEF DESCRIPTION OF THE DRAWINGS

The various features and advantages of this invention will become apparent to those skilled in the art from the following detailed description of the disclosed non-limiting embodiment. The drawings that accompany the detailed description may be briefly described as follows.

DETAILED DESCRIPTION OF THE EXEMPLARY EMBODIMENTS

Figure 1:
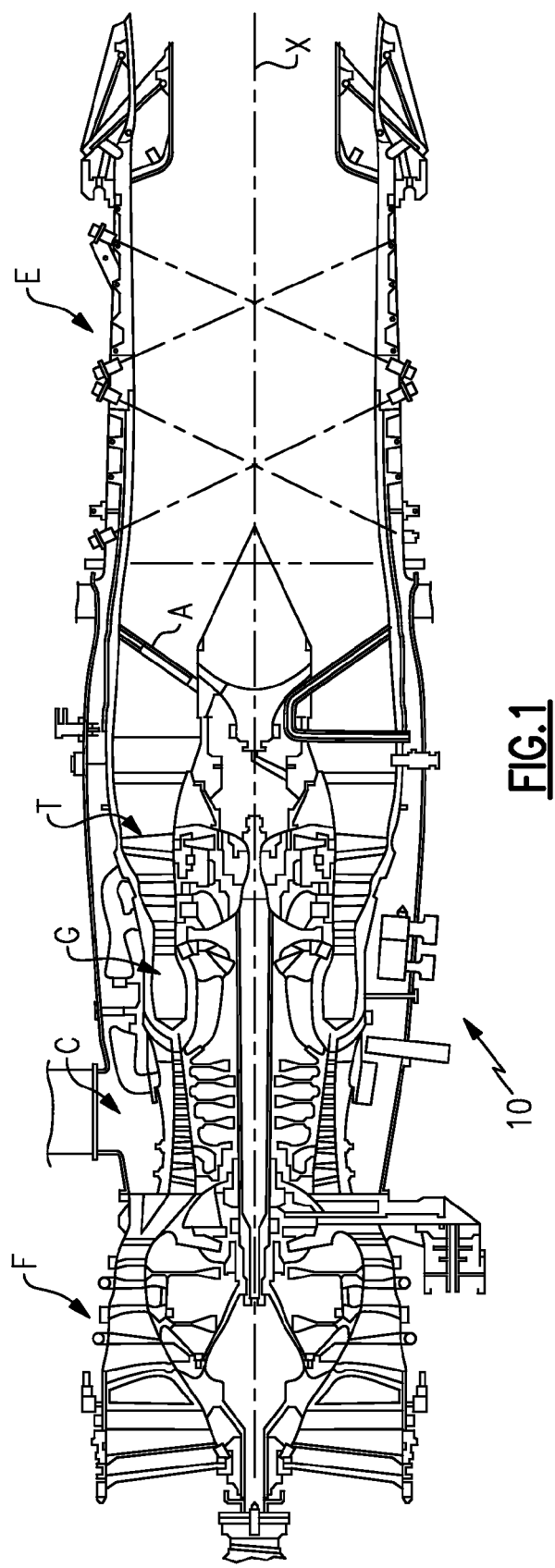
FIG. 1 is a schematic illustration of a gas turbine engine.

FIG. 1 schematically illustrates a gas turbine engine 10 which generally includes a fan section F, a compressor section C, a combustor section G, a turbine section T, an augmentor section A, and an exhaust duct assembly E. The compressor section C, combustor section G, and turbine section T are generally referred to as the core engine. An engine longitudinal axis X is centrally disposed and extends longitudinally through these sections. Although a particular engine configuration is illustrated and described in the disclosed embodiment, other engines may also benefit herefrom.

Figure 2:
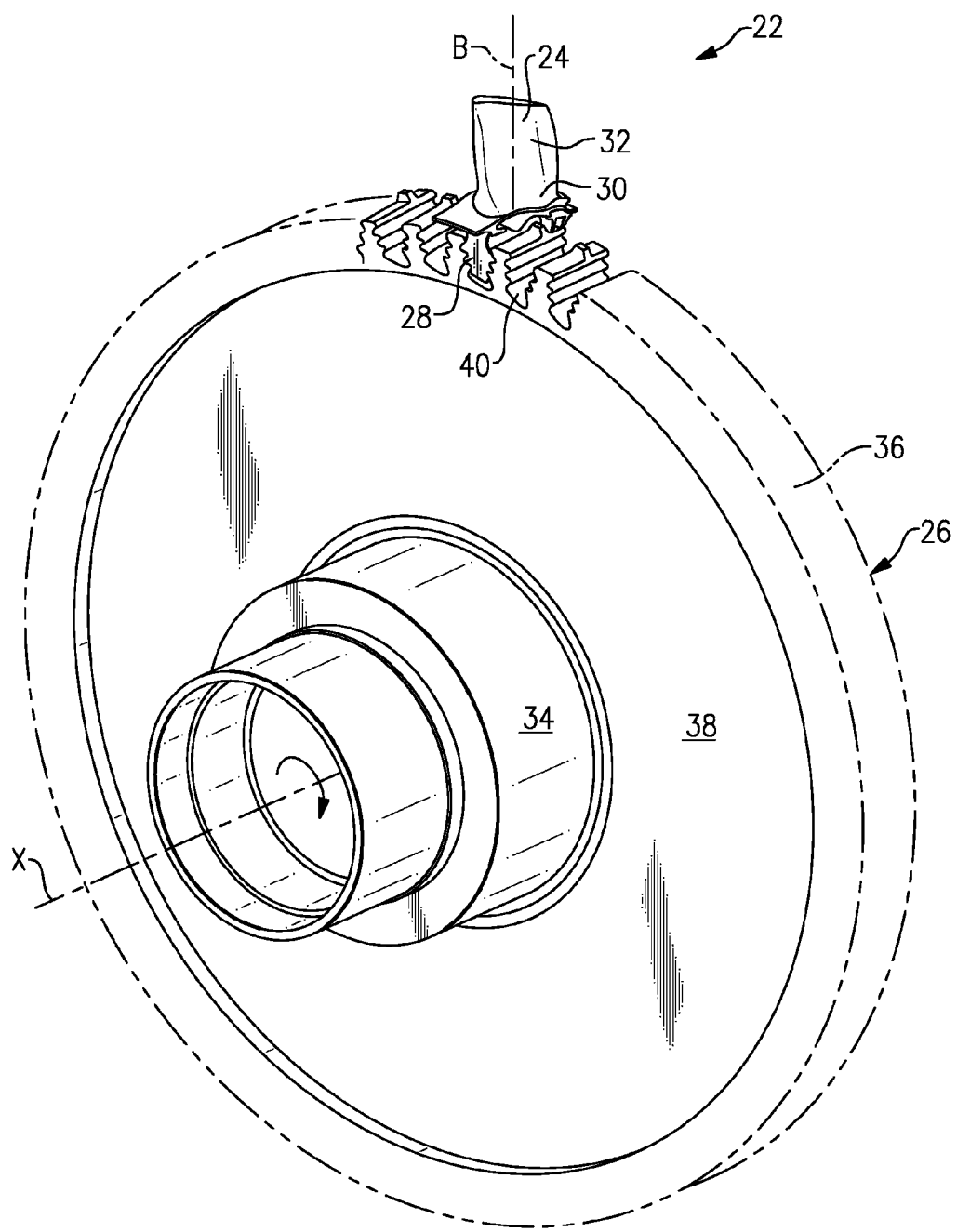
FIG. 2 is a perspective view of a single rotor blade mounted to a rotor disk.

Referring to FIG. 2, a rotor assembly 22 such as that of a first or second stage HPT (High Pressure Turbine disk assembly) of the gas turbine engine 10 is illustrated. It should be understood that a multiple of rotor disks may be contained within each engine section such as a fan section, a compressor section, and a turbine section. Although a particular rotor assembly 22 is illustrated and described in the disclosed embodiment, other sections which have other blades such as fan blades, low pressure turbine blades, high pressure turbine blades, high pressure compressor blades and low pressure compressor blades will also benefit herefrom.

The rotor assembly 22 includes a plurality of blades 24 circumferentially disposed around a rotor disk 26. Each blade 24 generally includes an attachment section 28, a platform section 30, and an airfoil section 32 along a radial axis B. The rotor disk 26 generally includes a hub 34, a rim 36, and a web 38 which extends therebetween. Each of the blades 24 is received within a blade retention slot 40 formed within the rim 36 of the rotor disk 26. The blade retention slot 40 includes a contour such as a fir-tree or bulb type which corresponds with a contour of the attachment section 28 to provide engagement therewith.

Figure 3:
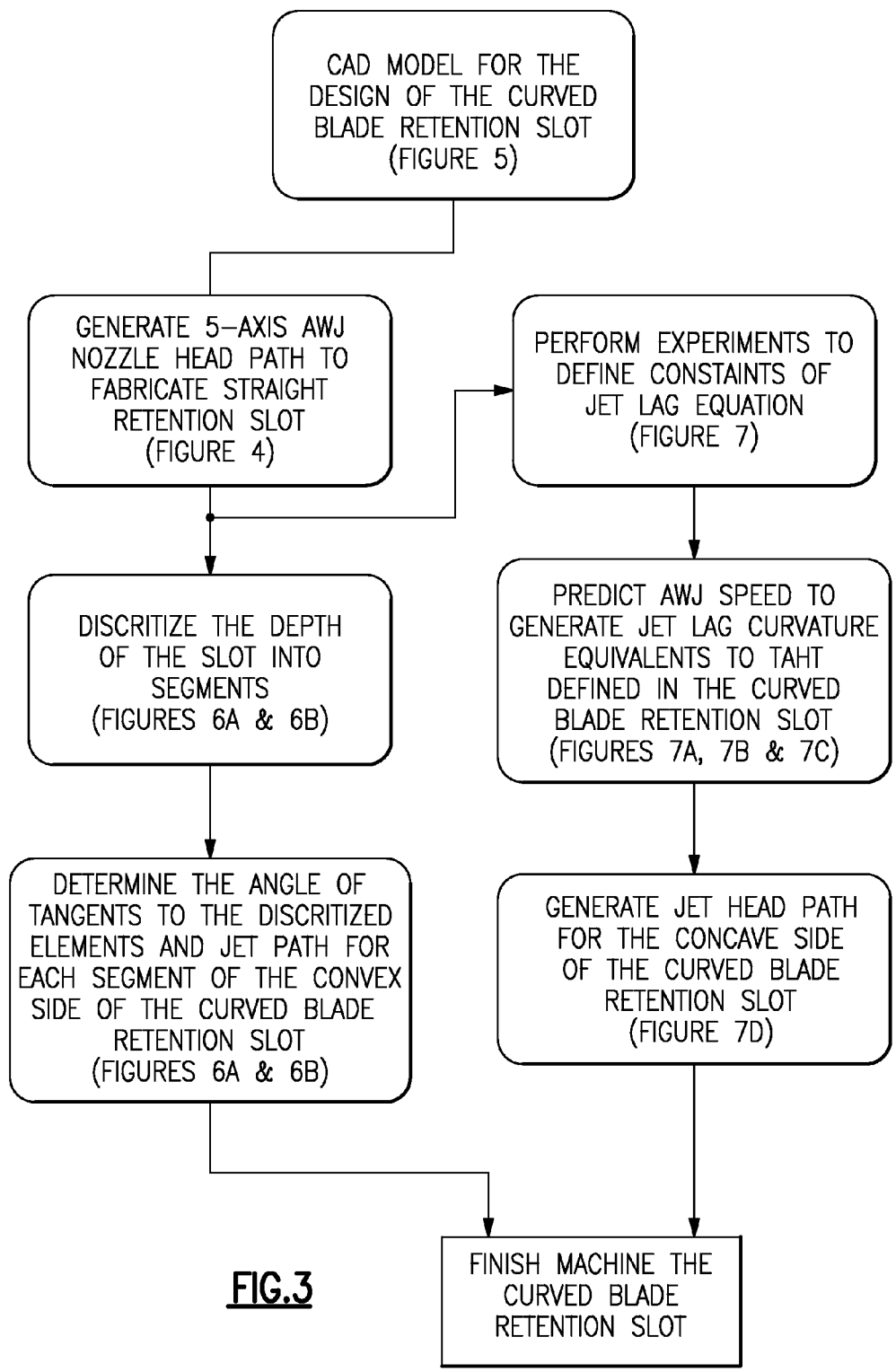
FIG. 3 is block diagram illustrating the methodology of one non-limiting embodiment may be utilized to manufacture the curved blade retention slot 40 with an abrasive water jet (AWJ)

Referring to FIG. 3, the following methodology of one non-limiting embodiment may be utilized to manufacture the curved blade retention slot 40 with an abrasive water jet (AWJ). The AWJ utilizes a continuous flow of water to gradually erode a contact surface of the rotor disk 26. For example, when water is compressed to high pressure levels about 20,000 psi to 87,000 psi and released through a small opening about 0.003 to 0.100 inches in diameter, the expanding water stream attains a speed up to three times the velocity of sound. Such a focused jet of water releases sufficient kinetic energy to cut through aerospace materials such as, but not limited to, nickel based alloys, titanium, hardened steel, stainless steel, Gamma titanium alluminade, ceramic, composite aluminum, etc. The effectiveness of the AWJ may be increased by fine abrasive particles. This process is referred to AWJ cutting and the particles entrained in the abrasive water jet accomplish almost 90% of the cutting action. Abrasive particles employed in the AWJ cutting process may include garnet, aluminum oxide, silicon nitride and diamond in mesh sizes that vary from about 36 to 150 and may especially include garnets of mesh size of about 80 to 100. AWJ nozzle diameters may range from about 0.075 to 2.50 millimeters and the distance between the AWJ nozzle and the workpiece surface generally varies from about 0.05 to 1.50 millimeters. An outer side of the AWJ nozzle may be shaped to conform to a desired shape to generate the blade retention slot 40.

Figure 4:
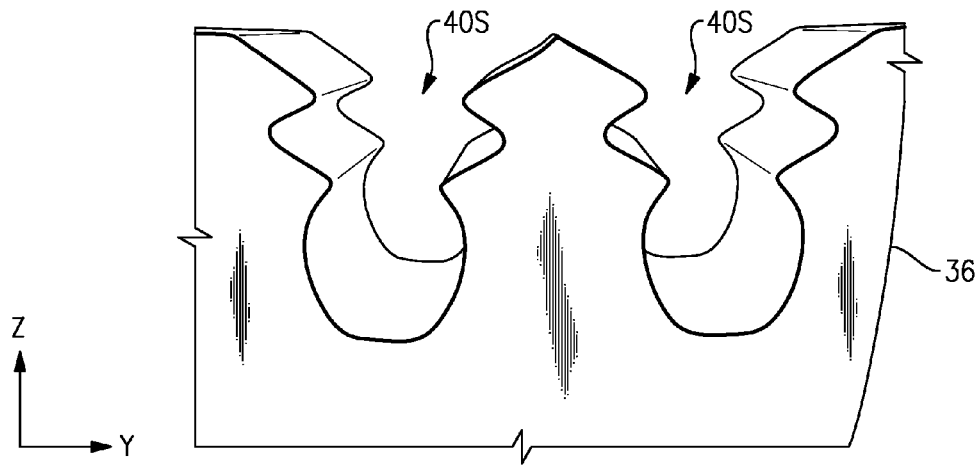
FIG. 4 is an expanded front view of a section of a rotor disk illustrating a straight blade retention slot.

An AWJ path is initially generated though software to machine a straight blade retention slot 40S (FIG. 4). That is, the AWJ cuts the straight blade retention slot 40S along an X-axis through the rim 36 of the rotor disk 26 prior to the curvature of each curved side of the curved blade retention slot 40 (FIG. 5) is AWJ machined therein. "Straight" as defined herein describes the straight blade retention slot 40S which may be cut directly through the rim 36 of the rotor disk 26 or otherwise manufactured along the X-axis. AWJ rough machining of the straight blade retention slot 40S may facilitate an intact removal of the attachment shape which increase the value of the recycled material by upwards of twenty times.

It should be noted that a computing device may be used to implement various functionality, such as that attributable to the AWJ path. In terms of hardware architecture, such a computing device may include a processor, memory, and one or more input and/or output (I/O) device interface(s) that are communicatively coupled via a local interface. The local interface may include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor may be a custom made or commercially available processor, a central processing unit (CPU), an auxiliary processor among several processors associated with the computing device, a semiconductor based microprocessor (in the form of a microchip or chip set) or generally any device for executing software instructions.

The memory may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory may also have a distributed architecture, where various components are situated remotely from one another, but may be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor may be configured to execute software stored within the memory, to communicate data to and from the memory, and to generally control operations of the computing device pursuant to the software. Software in memory, in whole or in part, is read by the processor, perhaps buffered within the processor, and then executed. The software may include a developed computer aided manufacturing code to generate the AWJ path based on the retention slot geometry.

Figure 5:
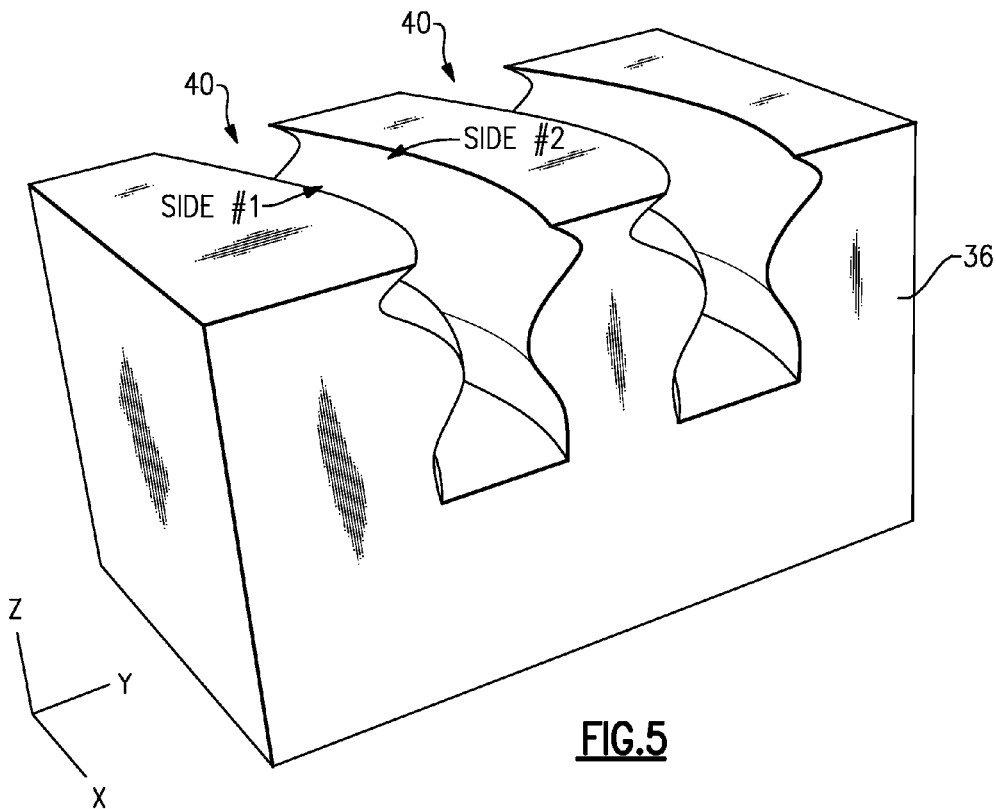
FIG. 5 is a perspective view of a section of a rotor disk illustrating a curved blade retention slot.

An AWJ form, lag dimension, and 5-axis motion of the AWJ head is operable to generate a 3D curve to the straight blade retention slot 40S (FIG. 5). Jet form and lag angle in addition to jet path produce the curved blade retention slot 40.

Referring to FIG. 5, each side of the curved blade retention slot 40 requires a different approach. The approach in this non-limiting embodiment is the generation of a convex side (side #1) and a concave side (side #2) through angular increment of the abrasive water jet. This approach roughs the curved blade retention slot 40 with minimal affect to surface microstructure or slot distortion of the material such as a nickel super-alloy turbine disk. Material removal rate is less than that achieved by broaching process; however, scrapping of material may be essentially reduce or eliminated such that value of recycled material is increased. In addition, cost and number of tooling required for finishing the slot is much less than current broaching process.

Figure 6B:
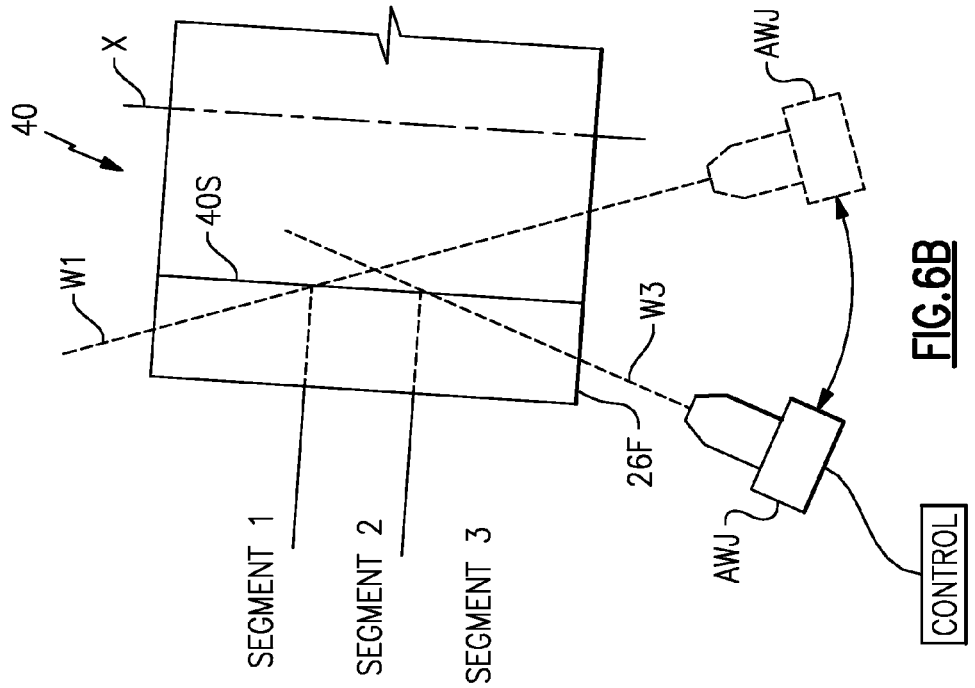
FIG. 6B is an expanded top view of the convex side of a curved blade retention slot being machined into a straight blade retention slot.
Figure 6A:
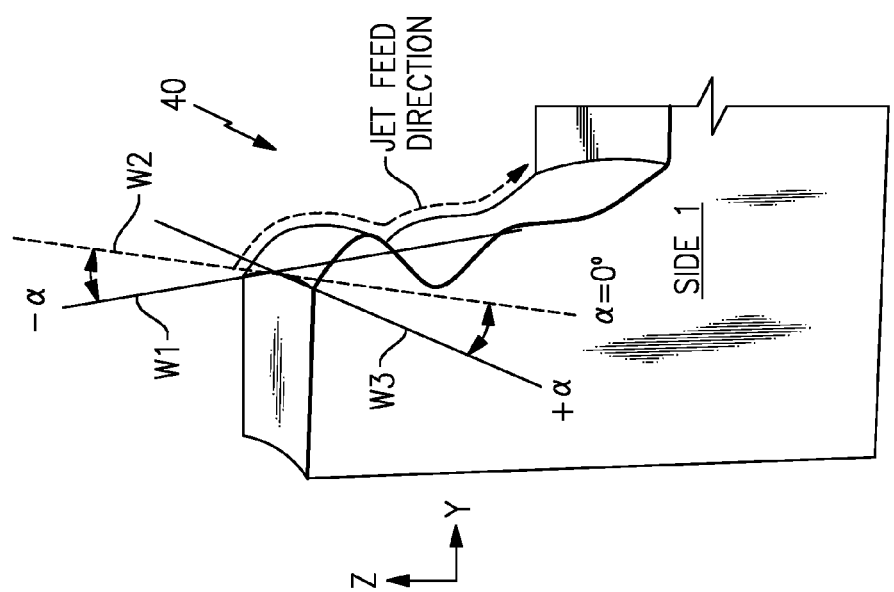
FIG. 6A is an expanded perspective view of a section of a rotor disk illustrating a convex side of a curved blade retention slot.

Referring to FIG. 6A, the desired curvature of the convex side (side #1) is induced on one side of the blade retention slot 40. The curved blade retention slot 40 may be separated into several segments along the X-direction in response to the desired curvature accuracy and the material thickness that is to remain for the finish process such as super abrasive machining (FIG. 6B).

The jet angle $\alpha$ is calculated for each segment (FIG. 6B) to generate the side #1 curvature. In the illustrated non-limiting embodiment, x-direction in FIG. 6B, the curved blade retention slot 40 is separated into three segments in which the jet angles are at a first angle of −10 degrees for segment 1; a second angle of 0 degrees for segment 2; and a third angle of +10 degrees for segment 3. It should be understood that any number of segments at a desired $\alpha$ may be defined to generate the desired curvature accuracy.

Figure 6C:
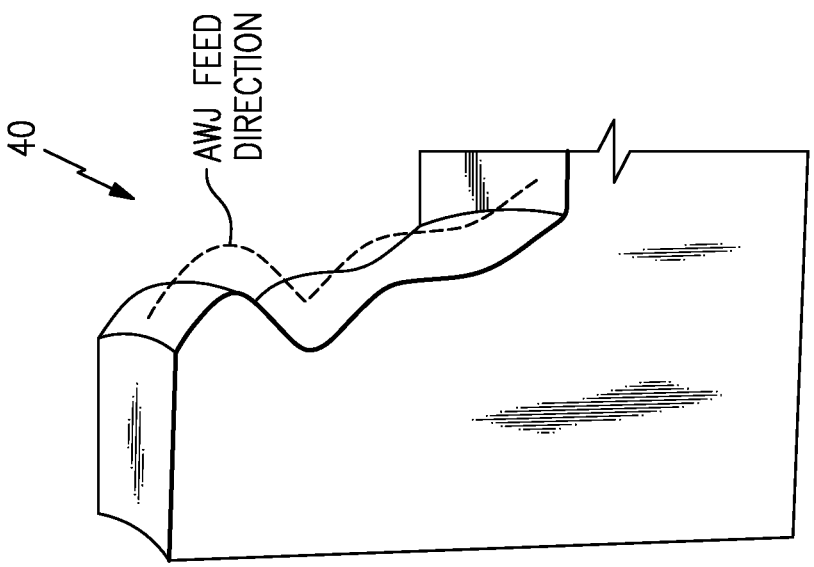
FIG. 6C is an expanded perspective view of a section of a rotor disk illustrating a convex side of a curved blade retention slot to illustrate an AWJ feed direction.

The water jet head is positioned to the first angle +$\alpha$ to define an AWJ path WI relative the first segment (Segment 1) then moved along the contours of the straight blade retention slot 40S along a desired jet feed direction at the first angle (FIG. 6C). That is, the water jet is directed at an angle relative the X-axis (FIG. 6B) to form a tangent relative the straight blade retention slot 40S to machine the first segment. The jet feed direction in one non-limiting embodiment is toward the valley in the Z-direction of the blade retention slot 40. As the water jet moves generally along the Z-direction, the water jet moves in and out in the Y-axis to follow the contours of the of the straight blade retention slot 40S (FIG. 6C). That is, the AWJ head moves to follow the contours of the straight blade retention slot 40S within a plane generally parallel to a face 26F of the rotor disk 26 such that the AWJ trims the straight blade retention slot 40S to form the concave side in a linear piece-wise manner in which each linear cut is formed in a respective segment.

Once the first segment is machined, the AWJ head is positioned to the third angle to define an AWJ path W33 is positioned to the third angle to define an AWJ path W3 relative the third segment (Segment 3) such that the curved segment is machined into the straight blade retention slot 40S as described with regard to the first segment. This segmented tangential machining is then continued for each additional segment defined along the entirety of side #1 (FIG. 6B). In the disclosed non-limiting embodiment, the second segment may be formed by the straight blade retention slot 40S such that no AWJ machining is required in Segment 2.

Figure 7A:
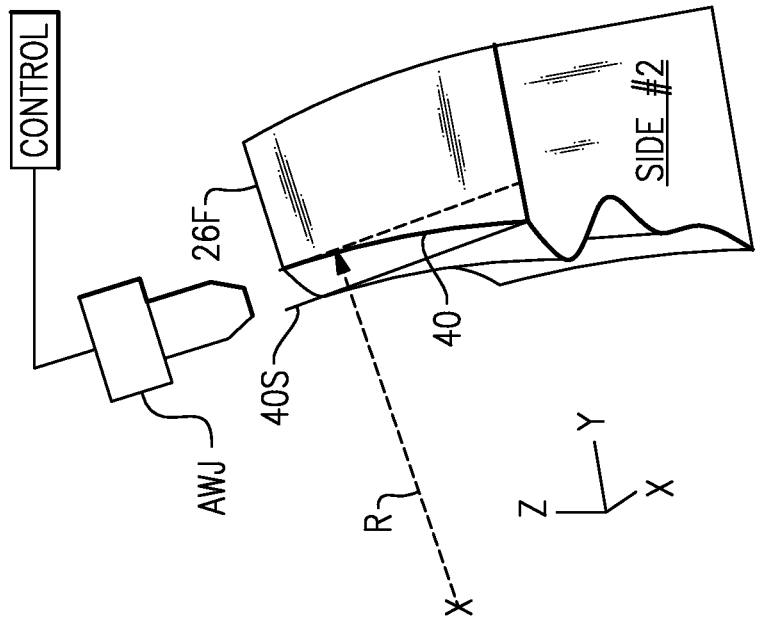
FIG. 7A is an expanded perspective view of a section of a rotor disk illustrating a concave side of a curved blade retention slot.

Referring to FIG. 7A, the desired curvature of the concave side (side #2) is machined into the other side of the straight blade retention slot 40S. For generation of the side #2 curvature, computational fluid dynamic models are utilized to predict a change in the water jet speed to obtain a desired depth of penetration. A combination of nozzle diameter, jet transverse speed, pump pressure, stand of distance, and workpiece material generates a specific curvature for the jet flare (FIG. 7B).

Figure 7B:
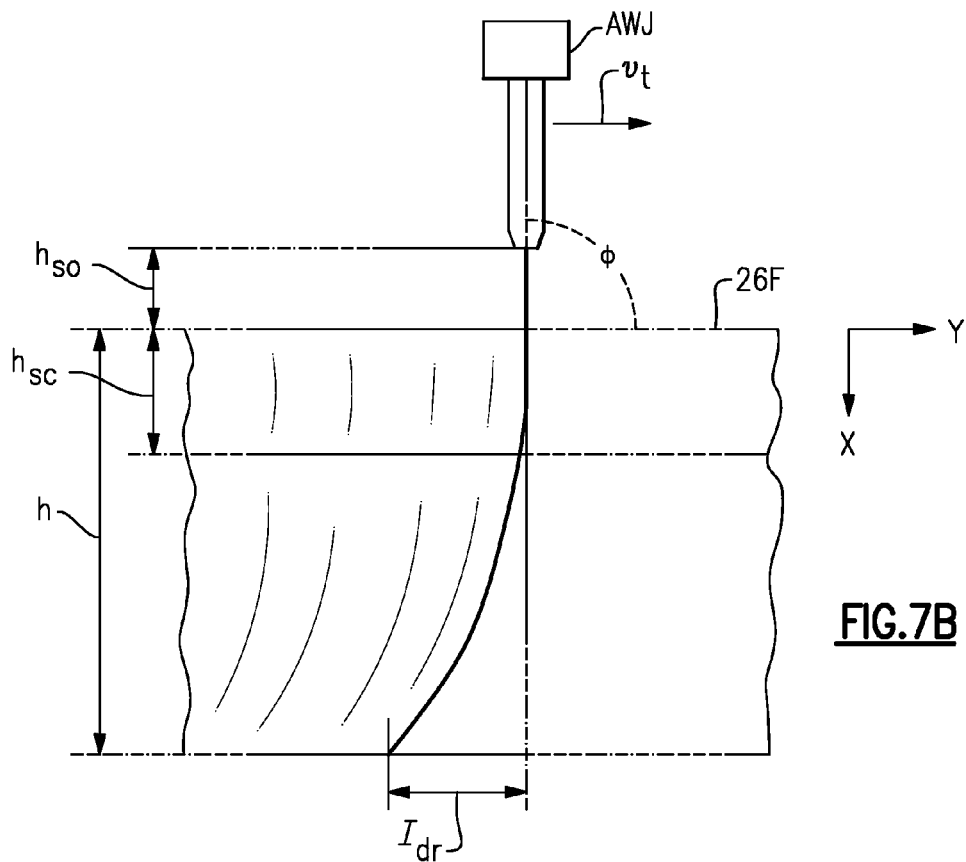
FIG. 7B is an expanded side view of the concave side of a curved blade retention slot being machined into a straight blade retention slot.
Figure 7C:
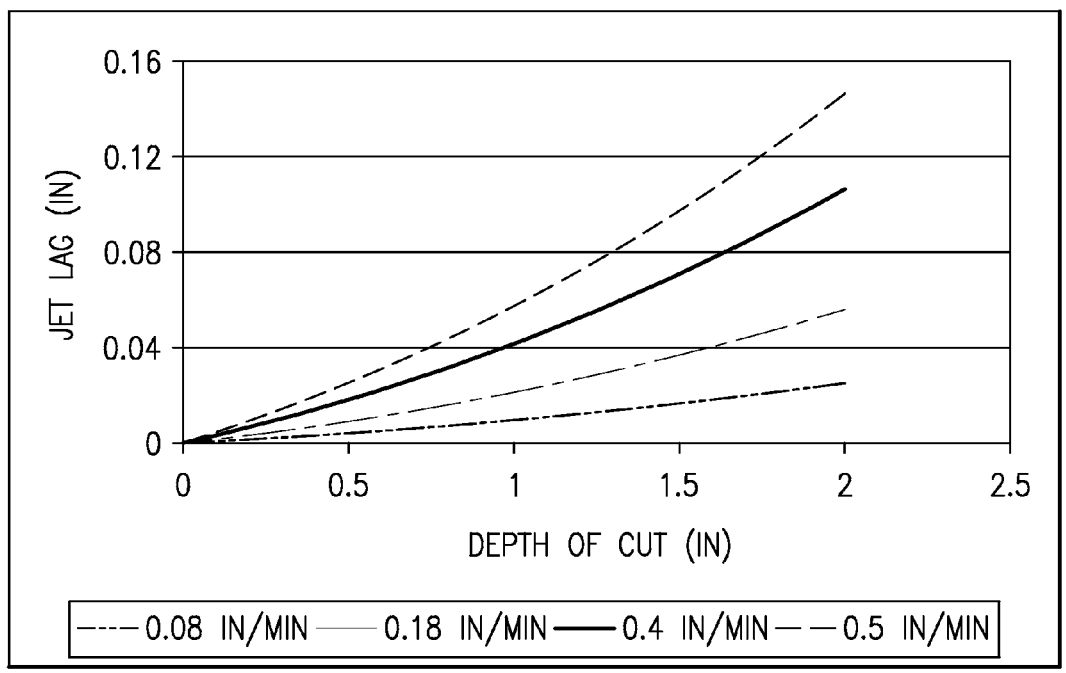
FIG. 7C is a graphical representation of and AWJ lag predicted as function of jet speed and slot thickness for a specific proprietary material.

Referring to FIG. 7B, an empirical jet lag equation is defined to predict the jet lag (see also FIG. 7C). One empirical jet lag equation is as follows:

$$l_{dr} = (Av_t + B)(h^2) + (Cv_t + D)(h) \quad [1]$$

Where
A, B, C, and D are constants related to the specific material;
$v_t$, is transverse velocity of AWJ cutting head;
$\phi$, is angle of incidence;
$h_{so}$, is AWJ cutting head stand-off distance;
h, is slot thickness;
$h_{sc}$, is depth of smooth cutting zone, which is equal to zero for a curved slot; and
$l_{dr}$ is jet lag.

Figure 7D:
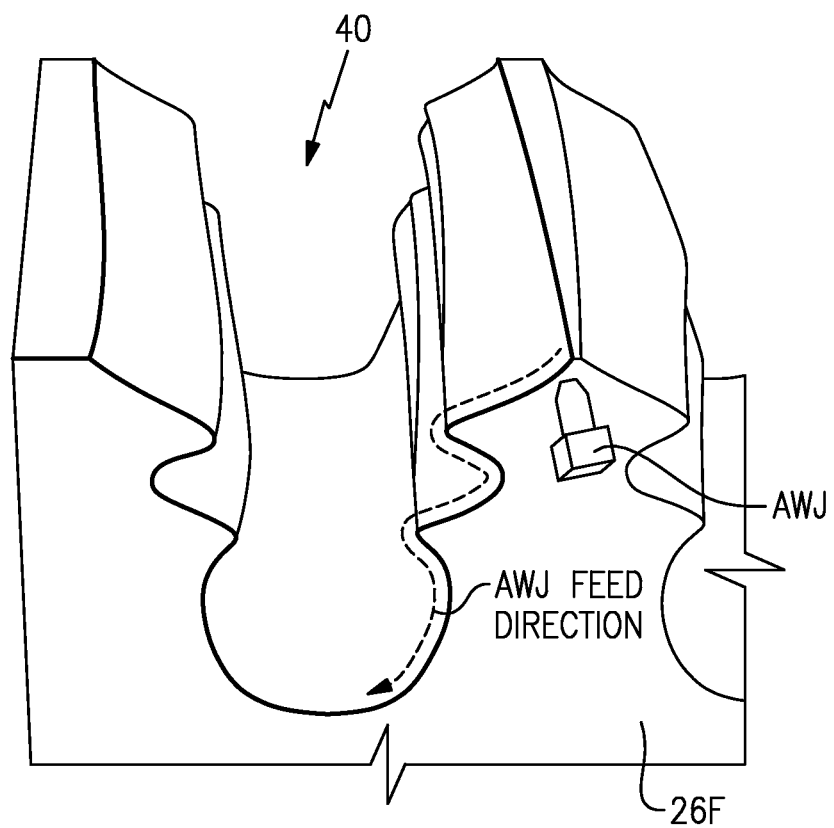
FIG. 7D is an expanded perspective view of a section of a rotor disk illustrating a concave side of a curved blade retention slot to illustrate an AWJ feed direction.

The jet lag equation is used for a specific material and jet parameters such that a change of jet lag is a function of AWJ transverse speed and slot depth in the X-axis direction. The jet lag equation is utilized to specify the AWJ transverse speed required to generate a desired curvature of the concave side (side #2) along the curved blade retention slot 40. Notably, the AWJ transverse speed along the AWJ feed direction (FIG. 7D) is changed to generate the desired curvature. The AWJ feed direction in one non-limiting embodiment is toward the valley in the Z-direction of the blade retention slot 40. As the AWJ head moves generally along the Z-direction, the water jet moves in and out in the Y-axis to follow the contours of the straight blade retention slot 40S. That is, the AWJ head moves to follow the contours of the straight blade retention slot 40S and within a plane generally parallel to the face 26F of the rotor disk 26 such that the jet lag forms the concave side. It should be understood that one or more passes may be required to generate the desired curvature.

The application of AWJ machining to produce the curved blade retention slot facilitate attachment designs in highly cambered turbine airfoils by minimizing platform overhang and optimizing stress distribution, without the increase in manufacturing cost. The utilization of the jet form to obtain the curved slot facilitate reducing the number of passes used by super abrasive machining for finishing the slot and production time. Waterjet machines minimize the possibility of scrapping the part because tool breakage or failure is relatively low.

It should be understood that like reference numerals identify corresponding or similar elements throughout the several drawings. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the disclosed embodiments are possible in light of the above teachings. One of ordinary skill in the art would recognize that certain modifications would come within the scope of this disclosure. It is, therefore, to be understood that within the scope of the appended claims, the invention may be practiced otherwise than as specifically described. For that reason the following claims should be studied to determine the true scope and content of this invention.

What is claimed:

1. A method of machining a blade retention slot comprising: abrasive water jet machining a straight blade retention slot, wherein the slot is defined to have a height extending along a z-axis, a width extending along a y-axis, and a depth extending along the x-axis; and
abrasive water jet machining at least one side of the straight blade retention slot to generate a curved side of the blade retention slot, said curved side defined within an X-Y plane.

2. A method as recited in claim 1, further comprising:
abrasive water jet machining the curved side of the blade retention slot into a convex side.

3. A method of machining a blade retention slot comprising:
abrasive water jet machining a straight blade retention slot, the straight blade retention slot defined along an X-axis; and
abrasive water jet machining at least one side of the straight blade retention slot to generate a curved side of the blade retention slot, said curved side defined within an X-Y plane, abrasive water jet machining the curved side of the blade retention slot into a convex side,
separating the at least one side of the straight blade retention slot into a multiple of segments along the X-axis;
defining an abrasive water jet angle for each of the multiple of segments.

4. A method as recited in claim 3, further comprising:
positioning an abrasive water jet at the abrasive water jet angle for a first of the multiple of segments; and
moving the abrasive water jet along a jet feed direction.

5. A method as recited in claim 4, further comprising:
moving the abrasive water jet along at least one contour of the straight blade retention slot in the jet feed direction.

6. A method as recited in claim 1, further comprising:
abrasive water jet machining the curved side of the blade retention slot into a concave side.

7. A method of machining a blade retention slot comprising:
abrasive water jet machining a straight blade retention slot, the straight blade retention slot defined along an X-axis;
abrasive water jet machining at least one side of the straight blade retention slot to generate a curved side of the blade retention slot, said curved side defined within an X-Y plane;
abrasive water jet machining the curved side of the blade retention slot into a concave side; and
moving an abrasive water jet at a variable transverse speed to generate the concave side.

8. A method of machining a blade retention slot comprising:
abrasive water jet machining a straight blade retention slot, the straight blade retention slot defined along an X-axis;

abrasive water jet machining at least one side of the straight blade retention slot to generate a curved side of the blade retention slot, said curved side defined within an X-Y plane;

abrasive water jet machining the curved side of the blade retention slot into a concave side; and moving the abrasive water jet along the X-axis to satisfy an empirical jet lag equation, the empirical jet lag equation having the form of:

$$l_{dr}=(Av_t+B)(h^2)+(Cv_t+D)(h)$$

Where:
A, B, C, and D are constants related to the specific material;
$v_t$, is transverse velocity of AWJ cutting head;
$\phi$, is angle of incidence;
$h_{so}$, is AWJ cutting head stand-off distance;
h, is slot thickness;
$h_{sc}$, is depth of smooth cutting zone, which is equal to zero for a curved slot; and
$l_{dr}$ is jet lag.

9. A method of machining a blade retention slot comprising:
abrasive water jet machining a straight blade retention slot, the straight blade retention slot defined along an X-axis;
abrasive water jet machining a first side of the blade retention slot into a convex side of a curved blade retention slot;
separating the first side of the straight blade retention slot into a multiple of segments along the X-axis;
defining an abrasive water jet angle for each of the multiple of segments; and
moving the abrasive water jet along a jet feed direction at an abrasive water jet angle for each of the multiple of segments and
abrasive water jet machining a second side of the blade retention slot into a concave side of the curved blade retention slot.

10. A method of machining a blade retention slot comprising:
abrasive water jet machining a straight blade retention slot, the straight blade retention slot defined along an X-axis;
abrasive water jet machining a first side of the blade retention slot into a convex side of a curved blade retention slot;
abrasive water jet machining a second side of the blade retention slot into a concave side of the curved blade retention slot; and
moving an abrasive water jet at a variable transverse speed to satisfy an empirical jet lag equation to generate the concave side, the empirical jet lag equation having the form of:

$$l_{dr}=(Av_t+B)(h^2)+(Cv_t+D)(h)$$

Where:
A, B, C, and D are constants related to the specific material;
$v_t$, is transverse velocity of AWJ cutting head;
$\phi$, is angle of incidence;
$h_{so}$, is AWJ cutting head stand-off distance;
h, is slot thickness;
$h_{sc}$, is depth of smooth cutting zone, which is equal to zero for a curved slot; and
$l_{dr}$ is jet lag.

11. A method of machining a blade retention slot comprising:
abrasive water jet machining a straight blade retention slot, the straight blade retention slot defined along an X-axis; and
moving an abrasive water jet at a variable transverse speed to satisfy an empirical jet lag equation to generate a concave side into the straight blade retention slot, the empirical jet lag equation having the form of:

$$l_{dr}=(Av_t+B)(h^2)+(Cv_t+D)(h)$$

Where:
A, B, C, and D are constants related to the specific material;
$v_t$, is transverse velocity of AWJ cutting head;
$\phi$, is angle of incidence;
$h_{so}$, is AWJ cutting head stand-off distance;
h, is slot thickness;
$h_{sc}$, is depth of smooth cutting zone, which is equal to zero for a curved slot; and
$l_{dr}$ is jet lag.

12. A system to machine a blade retention slot into a rotor disc suitable for use in a gas turbine engine comprising:
an abrasive water jet; and
a control in communication with said abrasive water jet, said control operable to move said abrasive water jet along a X-axis defined by a straight blade retention slot, to satisfy an empirical jet lag equation, the empirical jet lag equation having the form of:

$$l_{dr}=(Av_t+B)(h^2)+(Cv_t+D)(h)$$

Where:
A, B, C, and D are constants related to the specific material;
$v_t$, is transverse velocity of AWJ cutting head;
$\phi$, is angle of incidence;
$h_{so}$, is AWJ cutting head stand-off distance;
h, is slot thickness;
$h_{sc}$, is depth of smooth cutting zone, which is equal to zero for a curved slot; and
$l_{dr}$ is jet lag.

13. A method as recited in claim 1, further comprising forming the curved side as one of a concave or convex surface extending through a depth of the slot from a fore face of a rotor disc to an aft face of the rotor disc.

14. A method as recited in claim 13, wherein the step of abrasive water jet machining at least one side of the straight blade retention slot to generate a curved side of the blade retention slot further comprises abrasive water jet machining one side of the slot to form the concave surface extending through the depth of the slot and abrasive water jet machining an opposite side of the slot to form the convex surface extending through the depth of the slot.

* * * * *